US010144509B2

(12) United States Patent
Cruz Ayoroa

(10) Patent No.: US 10,144,509 B2
(45) Date of Patent: Dec. 4, 2018

(54) HIGH PERFORMANCE VTOL AIRCRAFT

(71) Applicant: Juan Gabriel Cruz Ayoroa, San Juan, PR (US)

(72) Inventor: Juan Gabriel Cruz Ayoroa, San Juan, PR (US)

(*) Notice: Subject to any disclaimer, the term of this patent is extended or adjusted under 35 U.S.C. 154(b) by 86 days.

(21) Appl. No.: 14/730,056

(22) Filed: Jun. 3, 2015

(65) Prior Publication Data

US 2015/0344134 A1     Dec. 3, 2015

Related U.S. Application Data

(60) Provisional application No. 62/006,977, filed on Jun. 3, 2014.

(51) Int. Cl.
*B64C 29/00* (2006.01)
*B64C 39/02* (2006.01)
*B64C 39/12* (2006.01)

(52) U.S. Cl.
CPC ........ *B64C 29/0033* (2013.01); *B64C 39/024* (2013.01); *B64C 39/12* (2013.01); *B64C 2201/021* (2013.01); *B64C 2201/042* (2013.01); *B64C 2201/088* (2013.01)

(58) Field of Classification Search
CPC ................. B64C 29/0033; B64C 39/12; B64C 2201/088; B64C 2201/042
See application file for complete search history.

(56) References Cited

U.S. PATENT DOCUMENTS

| 3,567,157 A * | 3/1971 | Dancik ............... B64C 29/0033 244/12.4 |
| 3,666,209 A * | 5/1972 | Taylor ................. B64C 29/0033 244/12.4 |
| 5,381,985 A * | 1/1995 | Wechsler ............ B64C 29/0033 244/12.4 |
| 5,823,468 A * | 10/1998 | Bothe ....................... B64B 1/08 244/12.3 |
| 6,655,631 B2 * | 12/2003 | Austen-Brown ....... B64C 27/28 244/12.4 |
| 7,118,066 B2 * | 10/2006 | Allen ....................... B64C 5/06 244/7 B |

(Continued)

*Primary Examiner* — Brian M O'Hara
*Assistant Examiner* — Keith L Dixon
(74) *Attorney, Agent, or Firm* — Eugenio J. Torres-Oyola; Victor M. Rodriguez-Reyes; Rafael Rodriguez-Muriel

(57) ABSTRACT

The present disclosure relates to a high performance Vertical Takeoff and Landing (VTOL) aircraft for executing hovering flight, forward flight, and transitioning between the two in a stable and efficient manner. The VTOL aircraft provides a highly stable, controllable and efficient VTOL aircraft. The preferred comprises: (1) a pusher propeller configuration with strategic placement which maximizes the effective use of thrust, (2) four propellers which allow for the highly-controllable and mechanically simple control methods used in multirotor aircraft, (3) electric motors which create mechanically simple, lightweight and reliable operation, (4) and a tandem wing configuration which is stable, controllable and efficient in both hovering and forward flight. The VTOL aircraft is capable of full runway, short runway or vertical takeoffs or landings, having unobstructed forward view for camera and sensor placement; and providing a compact, mechanically simple and low-maintenance VTOL aircraft design.

20 Claims, 15 Drawing Sheets

(56) References Cited

U.S. PATENT DOCUMENTS

| | | | |
|---|---|---|---|
| 7,997,526 B2* | 8/2011 | Greenley | A63H 27/02 244/12.4 |
| 8,800,912 B2* | 8/2014 | Oliver | B64C 29/0033 244/12.4 |
| 8,991,751 B2* | 3/2015 | Page | B64C 29/02 244/39 |
| 9,387,929 B2* | 7/2016 | Gaillimore | B64C 29/0066 |

* cited by examiner ic # HIGH PERFORMANCE VTOL AIRCRAFT

CROSS-REFERENCE TO RELATED APPLICATION

This application claims the benefit of U.S. provisional patent application Ser. No. 62/006,977 filed on Jun. 3, 2014

STATEMENT REGARDING FEDERALLY SPONSORED RESEARCH AND DEVELOPMENT

N/A

BACKGROUND OF THE INVENTION

Field of the Invention

The present invention relates to a Vertical Takeoff and Landing (VTOL) aircraft, more particularly to a high performance VTOL aircraft for executing hovering flight, forward flight, and transitioning between the two in a stable and efficient manner.

Discussion of the Background

Vertical Takeoff and Landing (VTOL) aircraft is an aircraft can take off, hover, transition to forward flight, and land vertically. Many designs had been proposed for several years. One of the main challenges of this type of aircraft design relates to the relative placement of propulsion units and wings in order to minimize interference such as the slipstream of the propulsion units hitting the wings thus reducing their effectiveness. For example, this is the case of the U.S. Pat. No. 8,616,492. U.S. Pat. No. 8,616,492 uses six propellers that are strategically placed so that the propeller slipstream of the fans only minimally hits parts of the aircraft when in forward flight configuration. However, a large fraction of the propeller slipstream hits the wing in when the propellers are in vertical flight configuration. Another attempt to circumvent this problem is provided by U.S. Pat. No. 6,655,631. U.S. Pat. No. 6,655,631 places the propellers on structures that extend forward and backwards from the wing far enough such that the propeller slipstream does not hit the wing in hover configuration. However, since the propellers rotate in place, the propeller slipstream from the front propellers hits the rear propellers and the wing when in forward flight configuration. This could cause a significant loss in performance of the rear propellers.

Further and more recent US patent application 20120261523 places the propellers similar to that of U.S. Pat. No. 6,655,631, but the entire structure rotates maintaining the same relative position of the fans such that the propeller slipstream of one fan never hits the another fan or the wing. Unfortunately on US patent application 20120261523 the propeller slipstream from the propellers contacts the propeller supporting structures at all times. Yet another significant setback of US patent application 20120261523 is that the size of the propellers and the overall design of the aircraft are significantly constrained by the requirement that the propeller disks and wings cannot overlap when seen from a top view of the hover configuration, and also that larger diameter propellers would need longer and heavier the supporting structures.

Another proposed design comprises a more compact planform reducing size and weight as in U.S. Pat. No. 2,478,847. However, the design presented in U.S. Pat. No. 2,478,847 A suffers from two major flaws which make it unpractical. Firstly, the design uses only two propellers under the wing, which would produce an aircraft that behaves as an inverted pendulum about its pitch axis, and therefore is unstable and has poor pitch control. The preferred embodiment of the present invention uses four propulsion units and a multirotor control method to resolve this issue. Secondly, the design presented in U.S. Pat. No. 2,478,847 requires a complex system of drive shafts to drive the propellers using a gas engine.

Therefore there is a need to provide a Vertical Takeoff and Landing (VTOL) aircraft executing hovering flight, forward flight, and transitioning between the two in a stable and efficient manner, having a holistic design including one or more wings along with two or more fan propulsion units attached to tilting propulsion unit supports which allow for the tilting of all propulsion units for the production of thrust between a general vertical and general forward direction, where all said tilting fan propulsion units are strategically placed in a pusher configuration to maximize effective thrust by limiting or preventing the fan propulsion unit slipstream from hitting the wings, the tilting propulsion unit support, or any other part of the aircraft at any tilt angle.

SUMMARY OF THE INVENTION

In light of the above shortcomings the present disclosure generally relates to a Vertical Takeoff and Landing (VTOL) aircraft which includes at least a wing, at least more than one tilting propulsion unit supports, and at least two propulsion units. More specifically it relates to a high performance VTOL aircraft for executing hovering flight, forward flight, and transitioning between the two in a stable and efficient manner, having a holistic design including one or more wings along with two or more fan propulsion units attached to tilting propulsion unit supports which allow for the tilting of all propulsion units for the production of thrust between a general vertical and general forward direction, where all said tilting fan propulsion units are strategically placed in a pusher configuration to maximize effective thrust by limiting or preventing the fan propulsion unit slipstream from hitting the wings, the tilting propulsion unit support, or any other part of the aircraft at any tilt angle.

In accordance with the principles of the present disclosure the exemplary embodiment employs a configuration that limits or prevents the propeller slipstream from hitting any part of the aircraft at any tilt angle, without limiting the overall design of the aircraft or the size of the propellers in such a way. It achieves this by (1) placing all the fans in pusher configuration, meaning that the propeller slipstream is produced away from the fan supporting structure, (2) by placing the propellers under the wing when in hover configuration and partly behind the wing in forward flight configuration so the propeller slipstream is always directed away from the wing, and (3) by displacing forward propellers with respect to rear propellers and wings to minimize or prevent propeller slipstream from the front propellers hitting the rear propellers or wings when in forward flight configuration. The present configuration effectively maximizes the use of available thrust, minimizing the required power for flight, and optimizing aircraft performance parameters such as flight time and range.

In accordance with the principles of the present disclosure the exemplary embodiment uses electric motors directly connected to the propellers to eliminate the need for complex drive shafts, thereby lowering the aircraft's weight and complexity, as well as manufacturing and maintenance costs. Finally, by employing four propellers instead of two, the preferred embodiment of the present invention is able to use the effective multirotor control method while in hover configuration.

An object of this disclosure is to provide a High Performance VTOL Aircraft that employs a holistic design of its propulsion units, wings, and overall vehicle configuration to provide an aircraft capable executing hovering flight, forward flight, and transitioning between the two in a highly stable, controllable and efficient manner.

Another object of this disclosure is to provide a high performance VTOL aircraft having one or more wings along with two or more fan propulsion units attached to tilting propulsion unit supports which allow for the tilting of all propulsion units for the production of thrust between a general vertical and general forward direction, where all said tilting fan propulsion units are strategically placed in a pusher configuration to maximize effective thrust by limiting or preventing the fan propulsion unit slipstream from hitting the wings, the tilting propulsion unit support, or any other part of the aircraft at any tilt angle.

Another object is to provide a High Performance VTOL Aircraft that provides a strategic design of its wings so as to provide favorable stability, controllability and performance qualities for both hover and forward flight, while simultaneously being compatible with said strategic placement of the thrust propulsion units.

Another object is to provide a High Performance VTOL Aircraft that provides a high degree of controllability on hover configuration by using two or more propulsion units for producing hover thrust and control torques.

Other objects and advantages of the present invention will become obvious to the reader and it is intended that these objects and advantages are within the scope of the present disclosure. To the accomplishment of the above and related objects, the present disclosure provides exemplary embodiments in the accompanying drawings.

To enable a better understanding of the objectives and features of the present invention, a brief description of the drawing below will be followed with a detailed description of the invention.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

Figure 1:
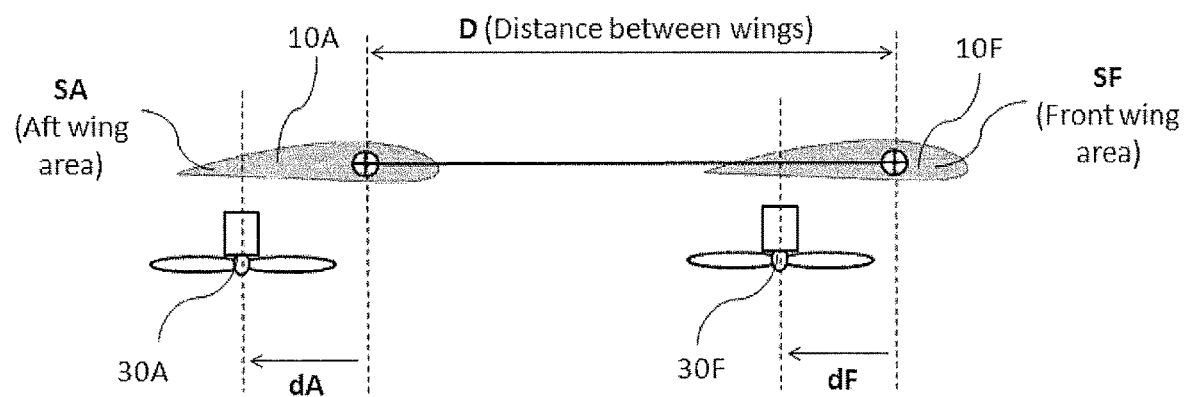
FIG. 1 is a general view of the position of the propulsion units and wings for the first exemplary embodiment in forward flight configuration in accordance with the principles of the present disclosure.

The description of illustrative embodiments according to principles of the present disclosure is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "mechanically coupled," "interconnected," and similar refer to a relationship wherein structures are secured or attached to one another either directly or indirectly through intervening structures, as well as both movable or rigid attachments or relationships, unless expressly described otherwise. Terms such as electronically coupled are directed to wire and wireless connections between electronic elements such as power supplies, amplifiers, computers and circuits. Moreover, the features and benefits of the disclosure are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

Turning now descriptively to the drawings, in which similar reference characters denote similar elements throughout the several views, the figures illustrate the exemplary embodiment having two wings, four propulsion units, four tilting propulsion unit supports, one fuselage, one landing gear, and one flight controller.

In order to maintain stability during hover flight, the thrust center (which is determined by the locations of the propulsion units) must be aligned on a vertical axis with the center of gravity of the aircraft 1 during hover flight. For stability during forward flight the aerodynamic center (which is determined by the locations and sizes of the wings) must be at or behind the center of gravity on a longitudinal axis during forward flight. Since both propulsion units and wings require specific positioning relative to the center of gravity of the aircraft 1, and the center of gravity is mostly fixed in one specific location, the result is that a VTOL aircraft 1 must have a very specific location of its propulsion units relative to its wings as well as very specific relative wing sizes in order to be able to maintain both hover stability and forward flight stability.

This concept can be illustrated using the diagram in FIG. 1, which shows two wings separated by a distance D, where the front wing 10F has a total wing area SF and the aft wing 10A has a total wing area SA. There are also some front propulsion units 30F which are located a distance dF behind the aerodynamic center of the front wing, and some aft propulsion units 30A located a distance dA behind the aerodynamic center of the aft wing. To simplify the analysis we will make a few assumptions. It is assumed that the center of gravity can be located anywhere in the aircraft 1 by shifting the weight distribution around, so we only need to worry about the relative location of the center of thrust and the aerodynamic center. The center of thrust will be located in the geometric center between the front propulsion units 30F and aft propulsion units 30A. It is assumed that during hover all propulsion units produce the same thrust, as this is the ideal scenario which requires least power for hover. The aerodynamic center is assumed to be located in the geometric center between the front and aft wings, weighted by the area of each wing. This means that if both wings have the same area, the aerodynamic center will be located in the midpoint between the center of gravity of the aft wing 10A and front wing 10F. However, if the front wing 10F has larger area than the aft wing 10A, the aerodynamic center would shift closer to the aerodynamic center of the front wing 10F. Note that in the diagram both wings are located on the same plane, as the vertical location of the wings or propulsion units has no effect on the analysis.

By using simple geometry we can find the required relation between the location of the propulsion units 30F and 30A relative to the wings 10F and 10A as well as the required wing sizes, so that the thrust center given by the propulsion unit locations matches the aerodynamic center given by the wing locations and sizes. It is assumed that if both aerodynamic and thrust centers match, hover and forward flight stability are attainable because the center of gravity can be adjusted appropriately to match these other two by shifting the weight distribution of the aircraft 1. The resulting equations are shown below:

$$\frac{SF}{A} = \frac{1}{2} - \frac{dA + dF}{2D}$$
$$\frac{SA}{A} = \frac{1}{2} + \frac{dA + dF}{2D}$$

In these equations, A is the total wing area, equal to the sum of the forward wing area SF and aft wing area SA. From these equations it can be clearly seen that if the propulsion units are shifted back relative to the wings (dA and dF are positive numbers), then the aft wing must be larger than the forward wing (SA>SF). For example, the preferred embodiment uses a dA+dF=D/3. Entering this into the equations results in SF/A=⅓ and SA/A=⅔, meaning that the aft wing area is two thirds of the total wing area, and therefore the aft wing needs to be larger than the forward wing in order to maintain both hover and forward flight stability. Since one of the central ideas of the invention is to have the propulsion units rotate between a location under the wing and a location behind the wing, the propulsion units will likely be located in a position that is shifted longitudinally backwards relative to the wings, and a larger aft wing relative to the front wing will most likely be required to maintain forward flight stability.

A. Wings

The wings are specially designed aerodynamic structures which may have control surfaces, flaps, airbrakes and other devices to modify their shape and aerodynamic properties as required. A wing is usually composed of two symmetric elongated structures with ends known as wing tips, and a center section of symmetry known as the root. The main function of the wing is to provide lift force, and allow for efficient and stable forward flight of the aircraft 1 in a manner similar to an airplane. The function may also include controlling the orientation of the aircraft 1 by actively modifying its aerodynamic properties by using the control surfaces or other devices. The wing can also be mechanically tilted to provide the same effect.

Figure 2A:
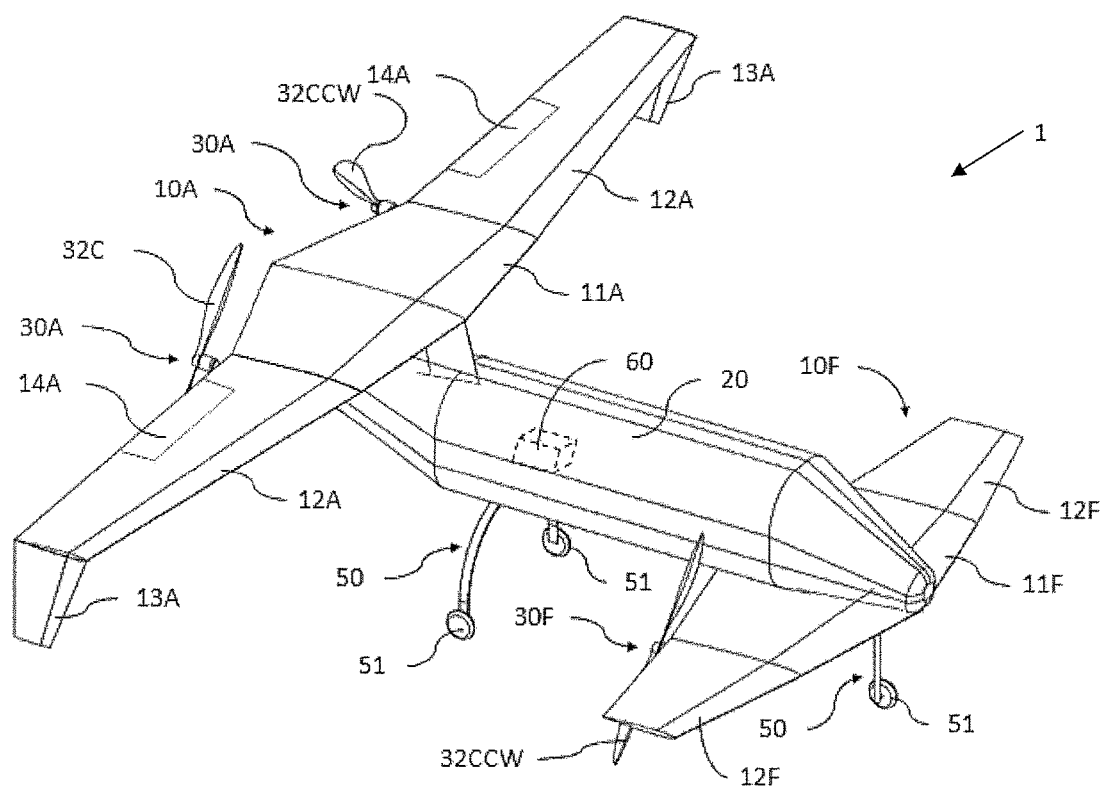
FIG. 2A is an upper perspective view of the first exemplary embodiment in forward flight configuration in accordance with the principles of the present disclosure.

As can be seen in FIG. 2A, the preferred embodiment has a tandem wing configuration where the aerodynamic lift load is distributed between one forward wing 10F and one aft wing 10A. The forward wing 10F is smaller than the aft wing 10A. As can be seen in FIG. 2F, the aft wing 10A is placed higher than the forward wing 10F to prevent the propeller slipstream 34 of the forward propulsion units 30F from hitting the aft propulsion units 30A or the aft wing 10A when the aircraft 1 is in forward flight configuration, and to minimize aerodynamic interaction between the wings. The aft wing 10A has moving control surfaces 14A which work as elevons, meaning they simultaneously work as conventional airplane ailerons to control the roll, and as conventional airplane elevators to control the pitch of the aircraft 1. The aft wing 10A also has a stabilizer 13A in each wing tip which works as vertical stabilizers to improve yaw stability to the aircraft 1. Additionally, the stabilizers 13A improve the aerodynamic efficiency of the aft wing 10A by reducing wingtip vortices, in a manner similar to wingtip winglets. As will be explained below, this particular wing configuration provides aerodynamic qualities which are favorable for both hovering and forward flight, and is compatible with the strategic placement of the propulsion units provided by this disclosure.

The preferred embodiment also uses wings with central sections 11A and 11F, and outer sections 12A and 12F. The outer wing sections 12A and 12F can be easily removed in order to reduce the size of the aircraft for transportation and storage. The outer wing sections could also have a telescoping mechanism so they could automatically retract into the central wing sections, using a retraction mechanism. This would allow the aircraft to be more compact for vertical takeoff and landing by retracting the wings, and then extending the wings while in flight before transitioning to forward flight. Although these options could provide additional convenience, the aircraft could also use wings that are fixed in place in order to minimize complexity and cost.

Other variations of the wings are possible. These variations include having more or less than two wings and changing the shape or location of the wings. For example, the two wings could be placed in the same plane instead of one being lower than the other one. Another example would be making the front wing smaller to act as a canard, instead of a wing. The wings could have the capability of tilting in order to provide aerodynamic control during flight. The wings could also have more control devices such as flaps, slats, and airbrakes. Another possibility is to not include control surfaces in the wings, and achieve control of the aircraft 1 through other methods such as by differential thrust or differential tilting of the propulsion units. Additionally, the stabilizers could be removed and the aircraft could be stabilized by other methods such as using the control surfaces for active stabilization. The stabilizers could also be designed in various other ways and placed in other parts of the aircraft 1.

B. Propulsion Units

The propulsion units are devices composed mainly of some type of thrust-producing fan such as a propeller, variable-pitch propeller, ducted fan, coaxial counter-rotating propellers, or rotor. The fan can be driven by an electric motor, a fuel-powered motor or other type of motor. The function of the propulsion unit is to provide thrust force to propel the aircraft, and to provide controllability of the aircraft by controlling the direction and magnitude of the thrust vectors. When a fan generates thrust, it also generates a stream of air called a slipstream in a direction opposite to the thrust force vector. The present invention places the propulsion units in a strategic way to limit or prevent the slipstreams from hitting parts of the aircraft, which would cause a reduction in effective thrust and could also lead to instability. One of the ways the present invention achieves this is by placing all fans in a pusher configuration, meaning that the thrust force vector is produced in the direction of the fan-supporting structure or device, and the slipstream is therefore directed away from said supporting structure or device. The present invention has two or more propulsion units, which allows for controlling the orientation of the aircraft to during flight by varying the thrust produced by each propulsion unit individually, which can be done by controlling the fan speed, the pitch of the blades, or otherwise. Since fans also generate torque, differential control of the torque can also be used to control the orientation of the aircraft. Each propulsion unit is connected to a tilting propulsion unit support, which attaches the fan propulsion unit to the aircraft while tilting it in a desired direction. The motor can be placed on the same tilting propulsion unit support, or could be placed on the aircraft, using some sort of pulley or drive system to drive the fans. One motor could be used to drive multiple fans, or each fan could have its own motor.

Figure 2B:
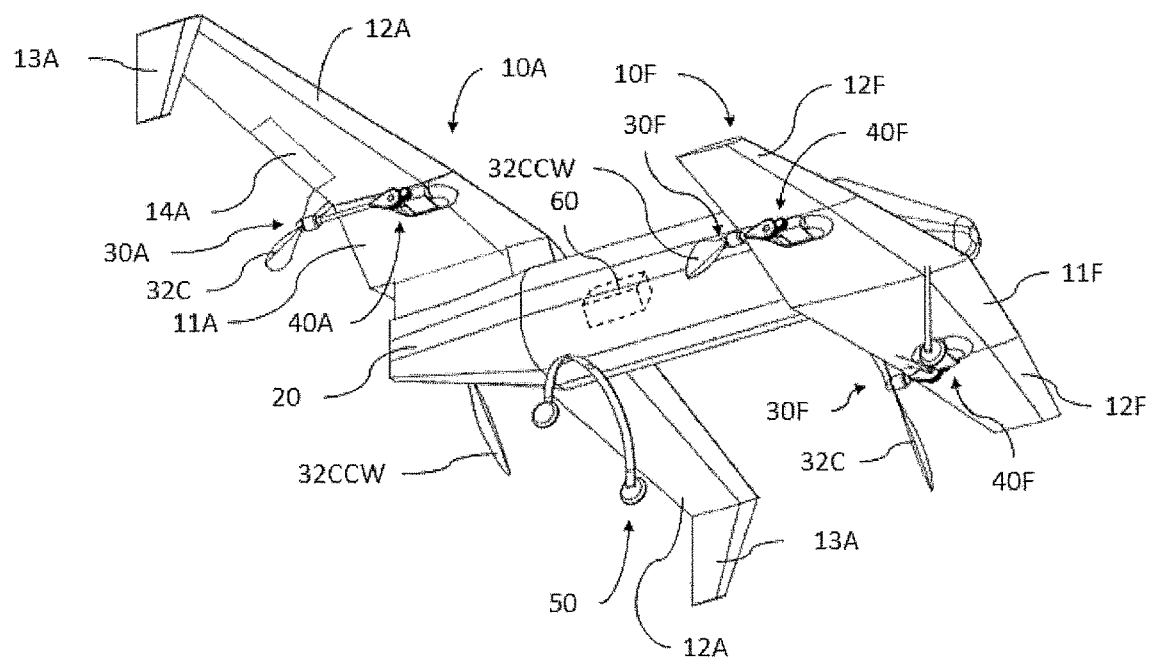
FIG. 2B is a lower perspective view of the first exemplary embodiment in forward flight configuration in accordance with the principles of the present disclosure.
Figure 2C:
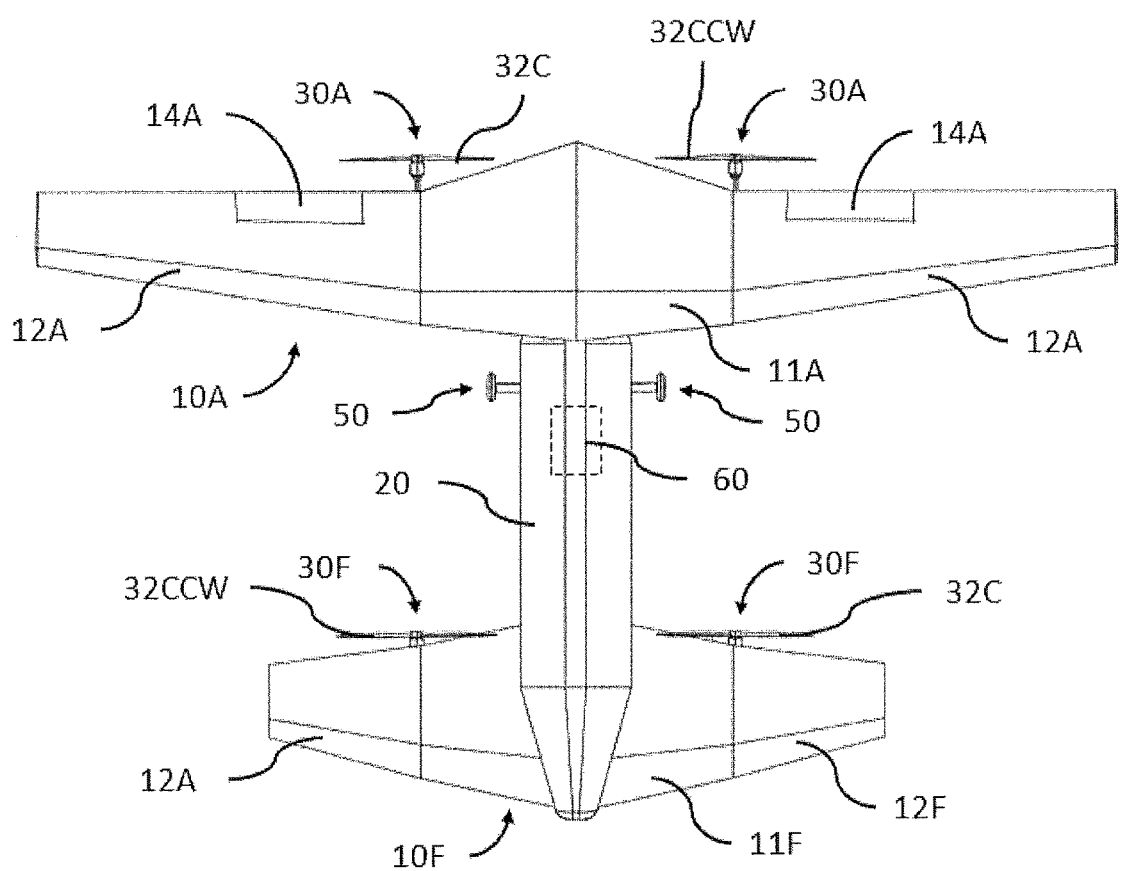
FIG. 2C is a top view of the first exemplary embodiment in forward flight configuration in accordance with the principles of the present disclosure.
Figure 2D:
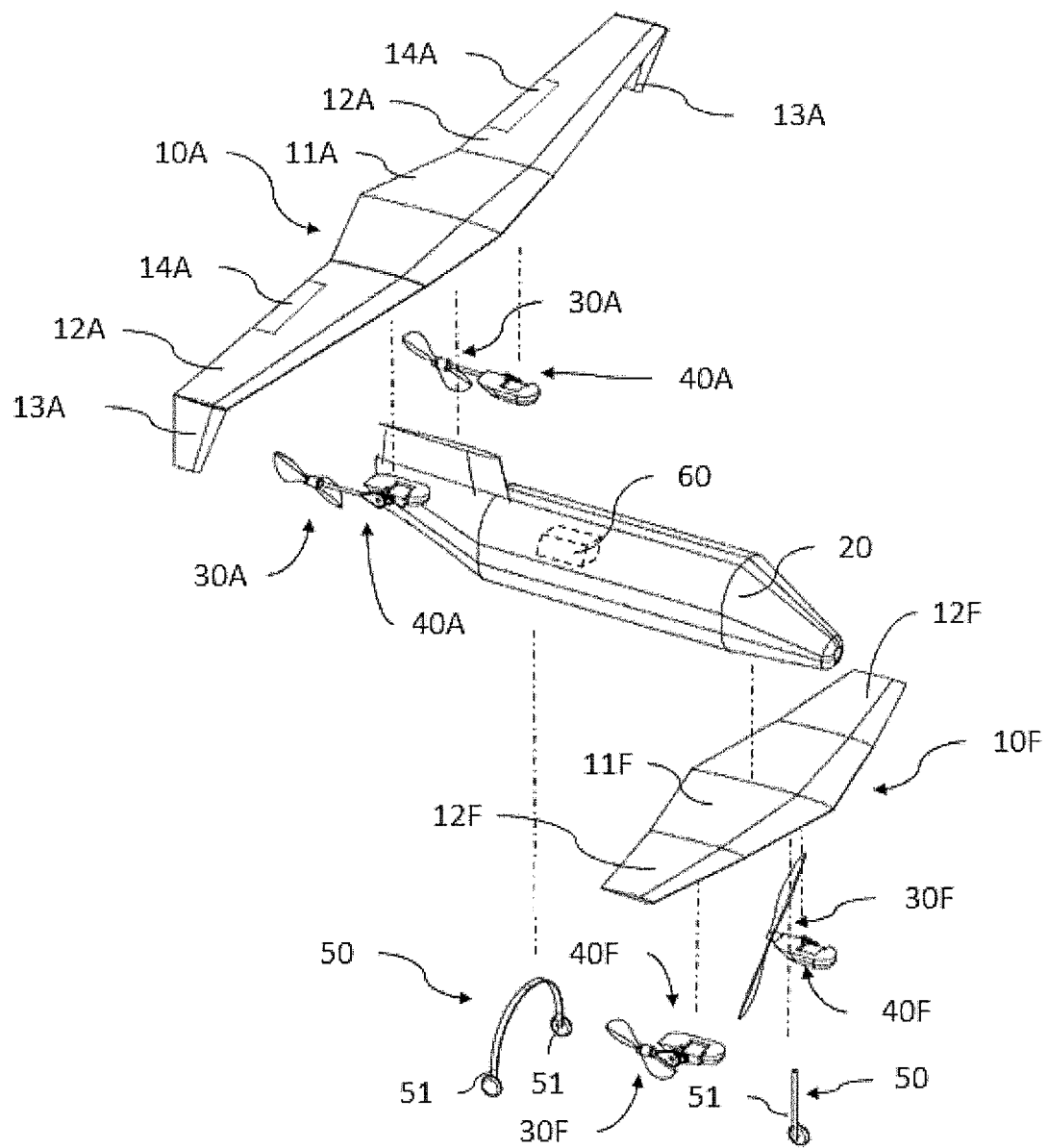
FIG. 2D is an exploded upper perspective view of the first exemplary embodiment in forward flight configuration in accordance with the principles of the present disclosure.

As can be observed in FIG. 2B, the preferred embodiment uses two forward propulsion units 30F and two aft propulsion units 30A, where each propulsion unit is composed of clockwise rotating propeller 32C or a counterclockwise rotating propeller 32CCW and an electric motor 31. Each propeller 32C or 32CCW is directly connected to an electric motor 31, and the electric motor 31 is connected to the rotating section 41A or 41F of a tilting propulsion unit support 40A or 40F, which attaches the propulsion unit to the wing 10A or 10F while tilting it in a desired direction. As can be observed in FIG. 2D, the propeller 32C or 32CCW is placed in a pusher configuration, meaning that the propellers produce a slipstream 34 in the direction away the motor 31. The electric motors are connected to the aircraft's electric power system which may include batteries to store the energy.

Other variations of the propulsion units are possible. The propulsion units could use variable pitch propellers, ducted fans, coaxial counter-rotating propellers, or rotors instead of fixed pitch propellers. A coaxial counter-rotating propeller configuration would use a pair of propellers which rotate in opposite directions and are placed one in front of another with coincident rotational axis. This allows for greater thrust force and thus greater lift capability for the aircraft, without increasing the overall size of the aircraft. Variable pitch propellers could be useful in order to maintain the efficiency and performance of the propulsion units across the varying flight conditions between hover and fast forward flight. The forward propulsion units could also use different fans than the aft propulsion units to allow more flexibility in the location of the aircraft's center of gravity. For example, the forward propulsion units could use propellers of larger diameter, or greater number of blades than the aft propulsion units, so that the forward propulsion units produce more thrust in nominal conditions, and the aircraft's center of gravity can be shifted forward while still maintaining hover stability. Fuel motors could also be used. A gearbox or transmission could be used to connect the propeller to the motor. The motor could also be placed on the aircraft and drive the propeller through pulleys or other drive system. One motor could be used to drive multiple propellers this way. Although the preferred embodiment uses four propulsuion units (two under each wing), a different number of propulsion units could also be used. For example, four propulsion units could be installed under each wing, for a total of eight propulsion units. This would increase the lift capability of the aircraft and also provide improved redundancy and reliability to the system in case of a failure of one of the propulsion units.

C. Tilting Propulsion Unit Supports

A tilting propulsion unit support is a mechanical structure with a fixed section and a rotating section. The rotating section is connected to a propulsion unit, while the fixed section is attached to the aircraft. The tilting propulsion unit support has a hinge and actuator that allow controlled tilting of the rotating section about one or more axis. The function of the tilting propulsion unit support is to transfer the thrust force from the propulsion unit to the aircraft, while being able to tilt the propulsion unit in a desired direction in order to control the direction of the propulsion unit's thrust vector. All tilting propulsion unit supports orient the propulsion units such that the fan slipstream is directed away from the tilting propulsion unit support at all times. The tilting propulsion unit supports can tilt the propulsion units to produce thrust vectors between the general vertical direction and the general forward direction with respect to the aircraft. The tilt configuration for production of thrust in the vertical direction enables the aircraft to perform sustained hovering flight, and is referred to as the aircraft's hovering flight configuration. The tilt configuration for production of thrust in the forward direction enables the aircraft to fly forward using its wings in a manner similar to an airplane, and is referred to as the aircraft's forward flight configuration. Orientations of the thrust vector between the vertical and forward direction can be used to transition the aircraft between hovering and forward flight, and is referred to as the aircraft's transition configuration. The tilting propulsion unit support is designed to produce a specific translational movement of the propulsion units as they rotated between vertical and horizontal orientations. This translational movement of the propulsion units can be adjusted so the net thrust vector moves in a specific and favorable way relative to the aircraft's center of gravity. This feature will be explained in more detail in section H.

Figure 2E:
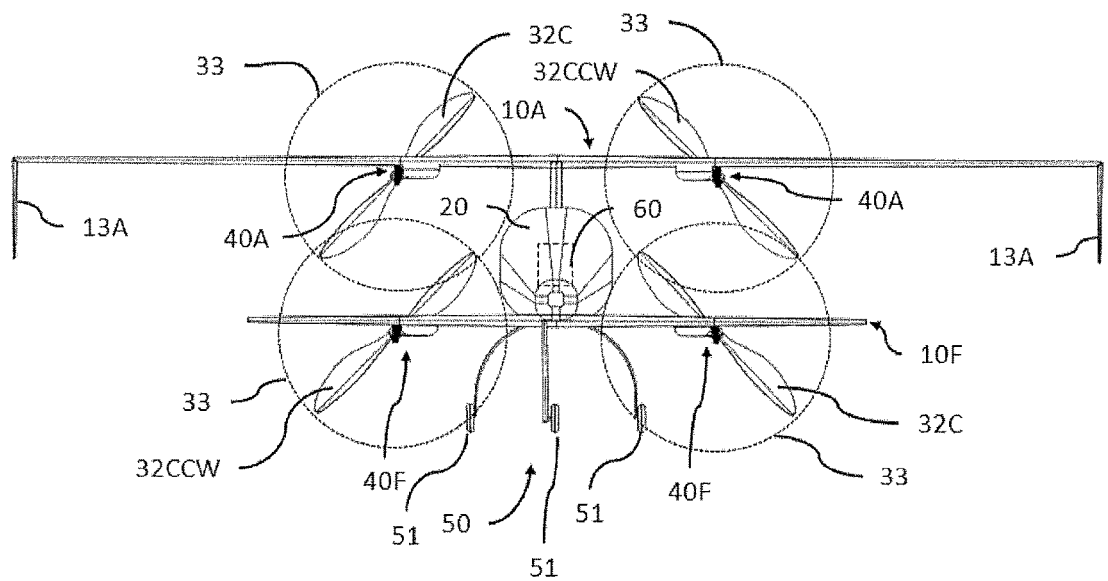
FIG. 2E is a front view including notional drawings of the propeller disks of the first exemplary embodiment in forward flight configuration in accordance with the principles of the present disclosure.
Figure 2F:
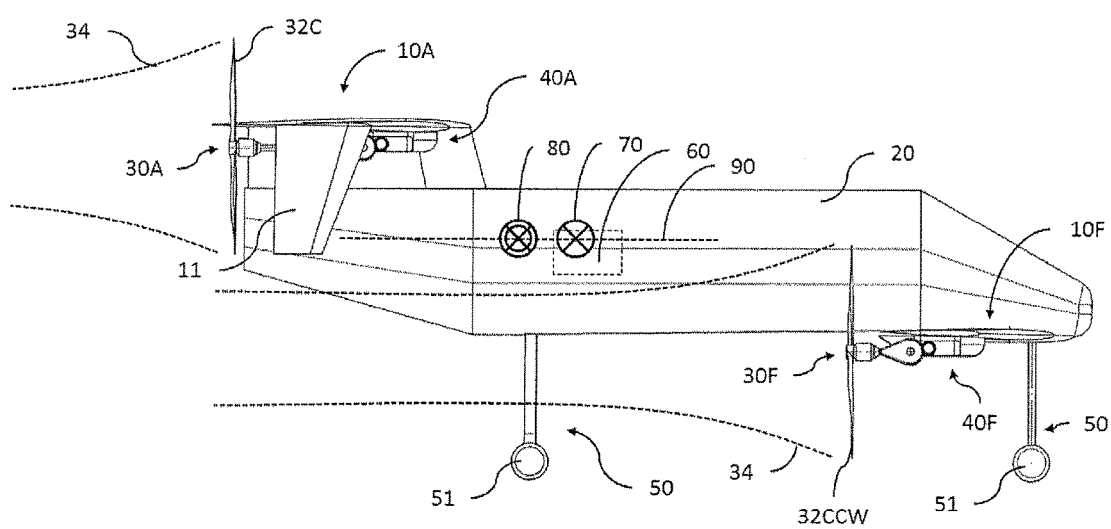
FIG. 2F is a left side view including notional drawings of the center of gravity, center of thrust, thrust line, and propeller slipstreams of the first exemplary embodiment in forward flight configuration in accordance with the principles of the present disclosure.
Figure 3A:
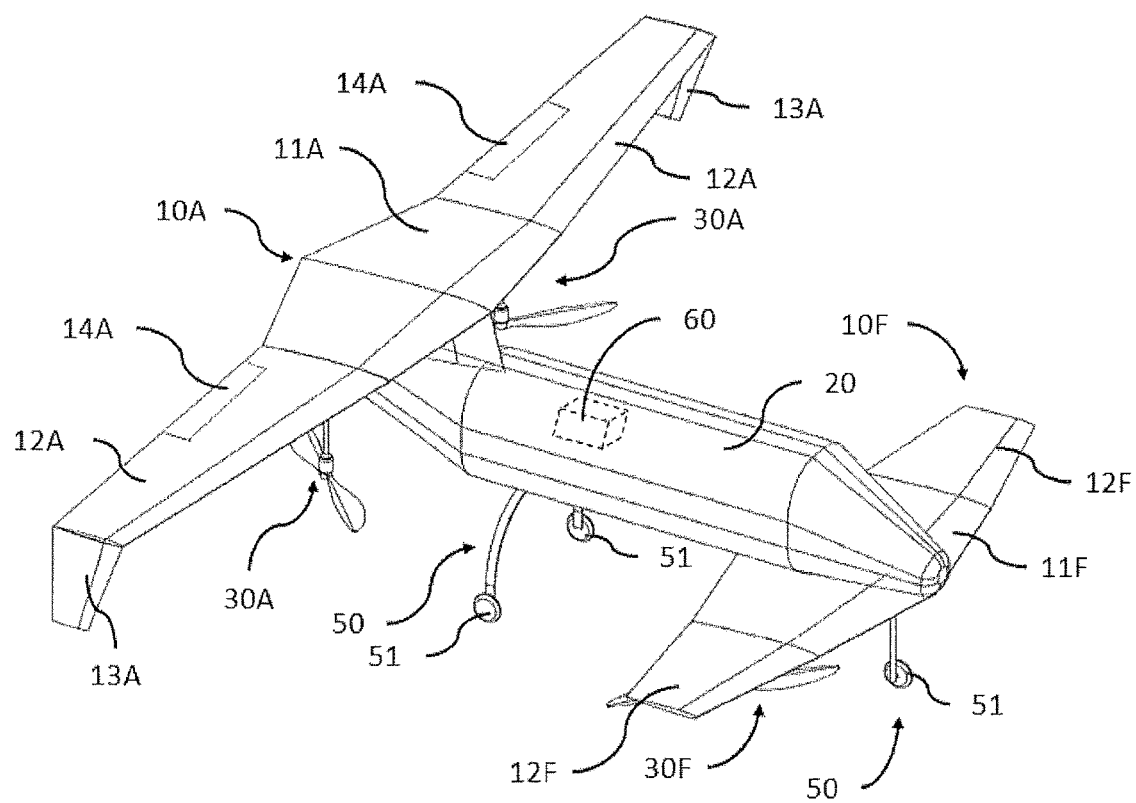
FIG. 3A is an upper perspective view of the first exemplary embodiment in hovering flight configuration in accordance with the principles of the present disclosure.
Figure 3B:
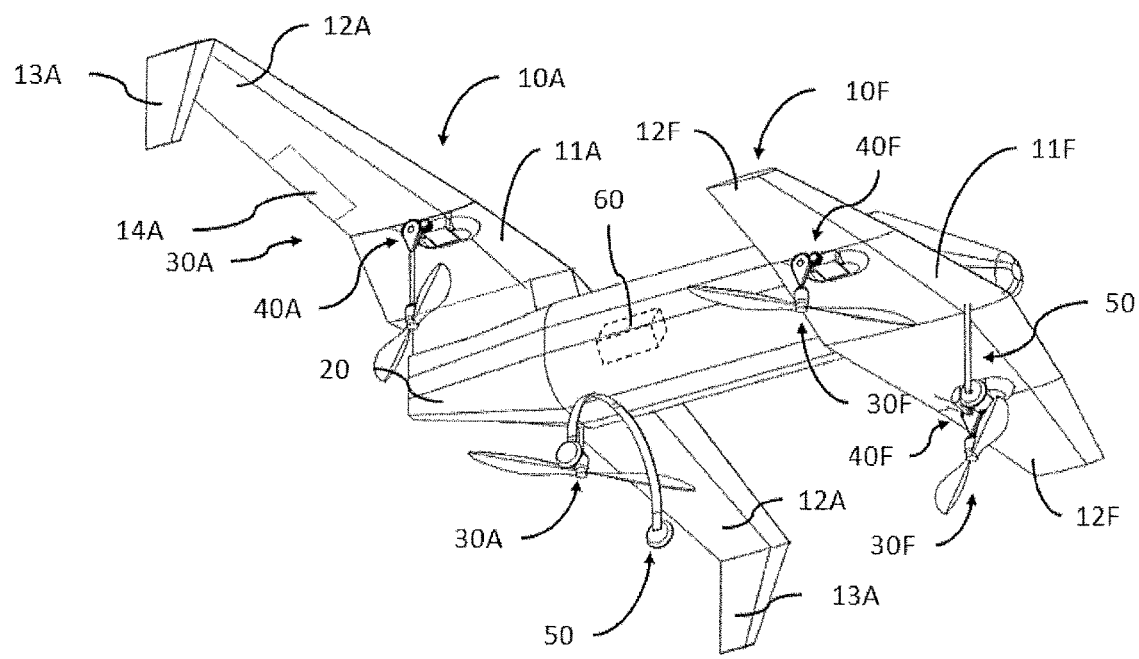
FIG. 3B is a lower perspective view of the first exemplary embodiment in hovering flight configuration in accordance with the principles of the present disclosure.
Figure 3C:
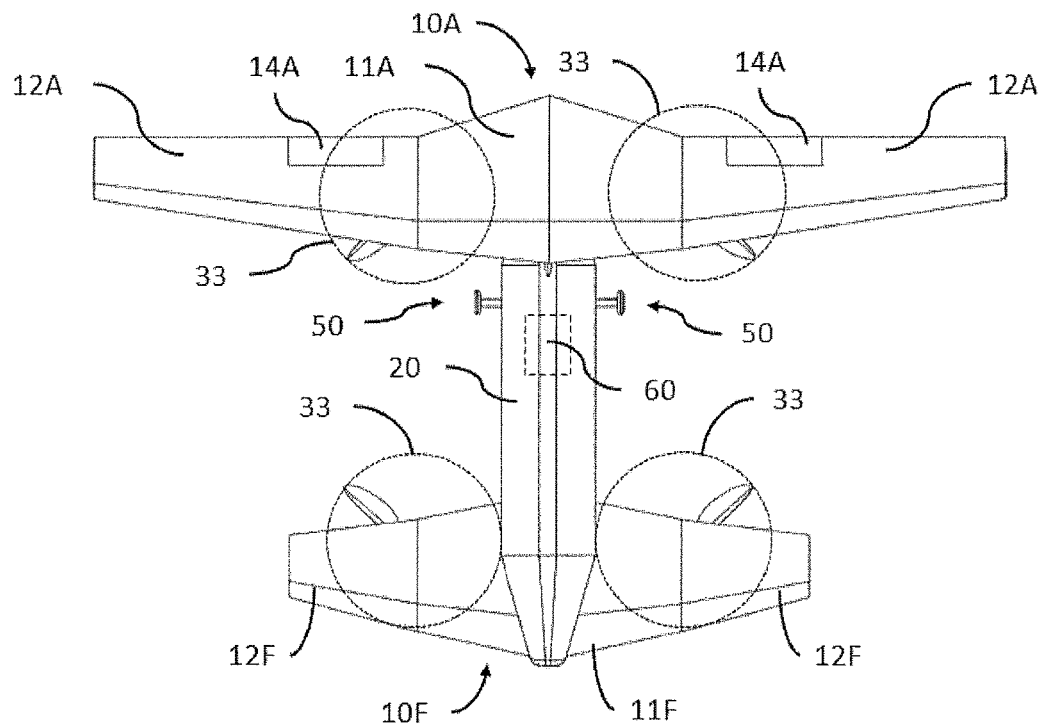
FIG. 3C is a top view including notional drawings of the propeller disks of the first exemplary embodiment in hovering flight configuration in accordance with the principles of the present disclosure.
Figure 3D:
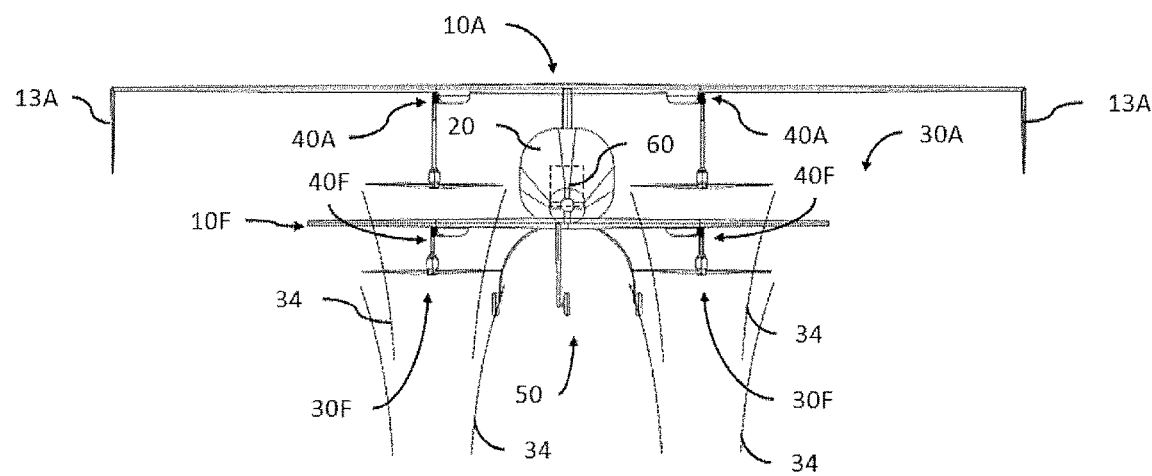
FIG. 3D is a front view including notional drawings of the propeller slipstreams of the first exemplary embodiment in hovering flight configuration in accordance with the principles of the present disclosure.
Figure 3E:
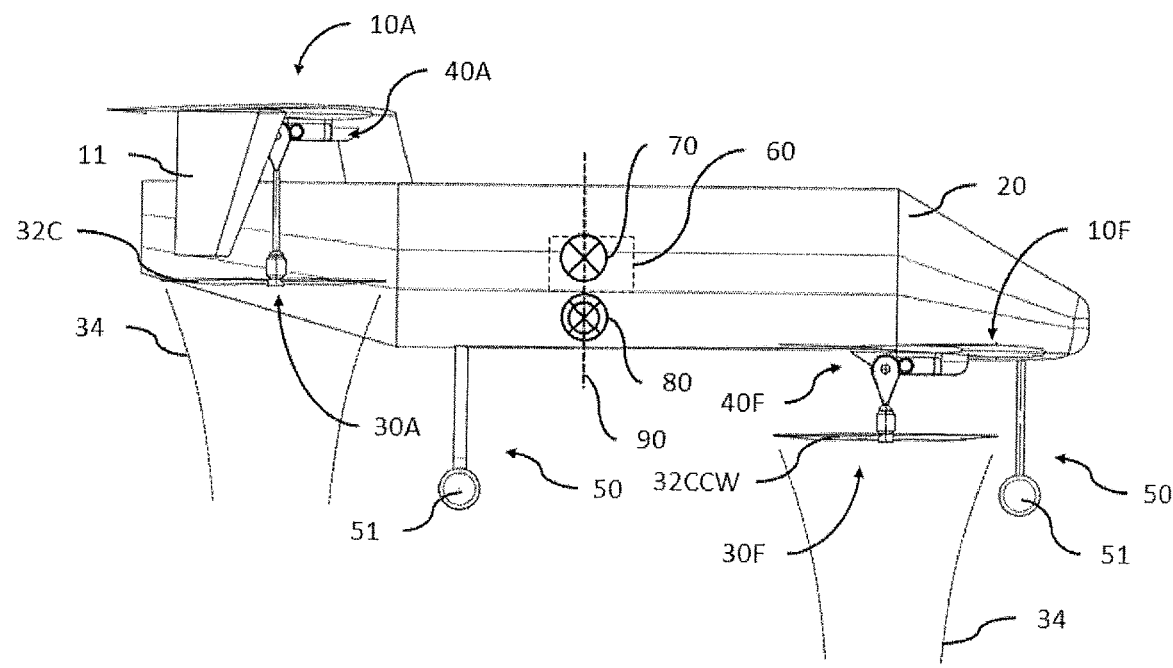
FIG. 3E is a right side view including notional drawings of the center of gravity, center of thrust, thrust line, and propeller slipstreams of the first exemplary embodiment in hovering flight configuration in accordance with the principles of the present disclosure.
Figure 4A:
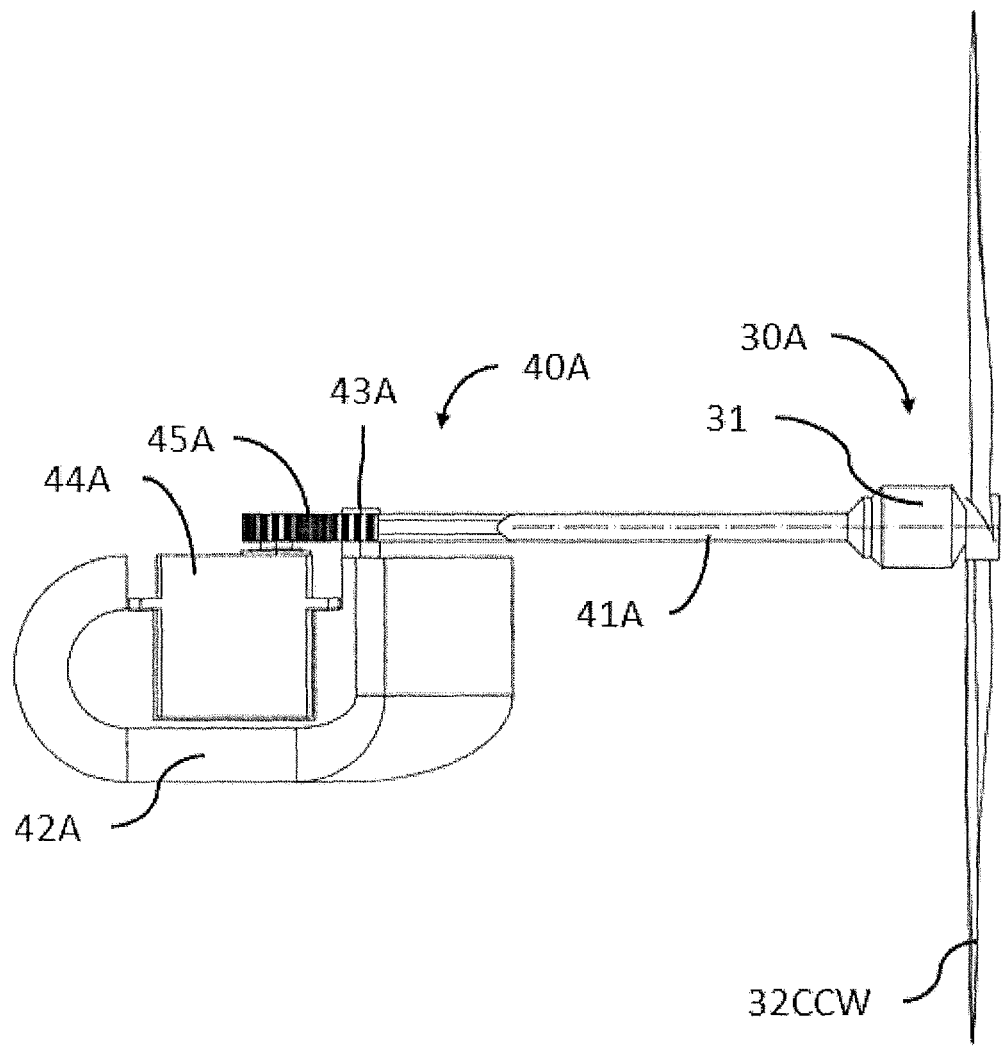
FIG. 4A is a bottom view detailing the aft tilting propulsion unit support and propulsion unit in forward flight configuration in accordance with the principles of the present disclosure.
Figure 4B:
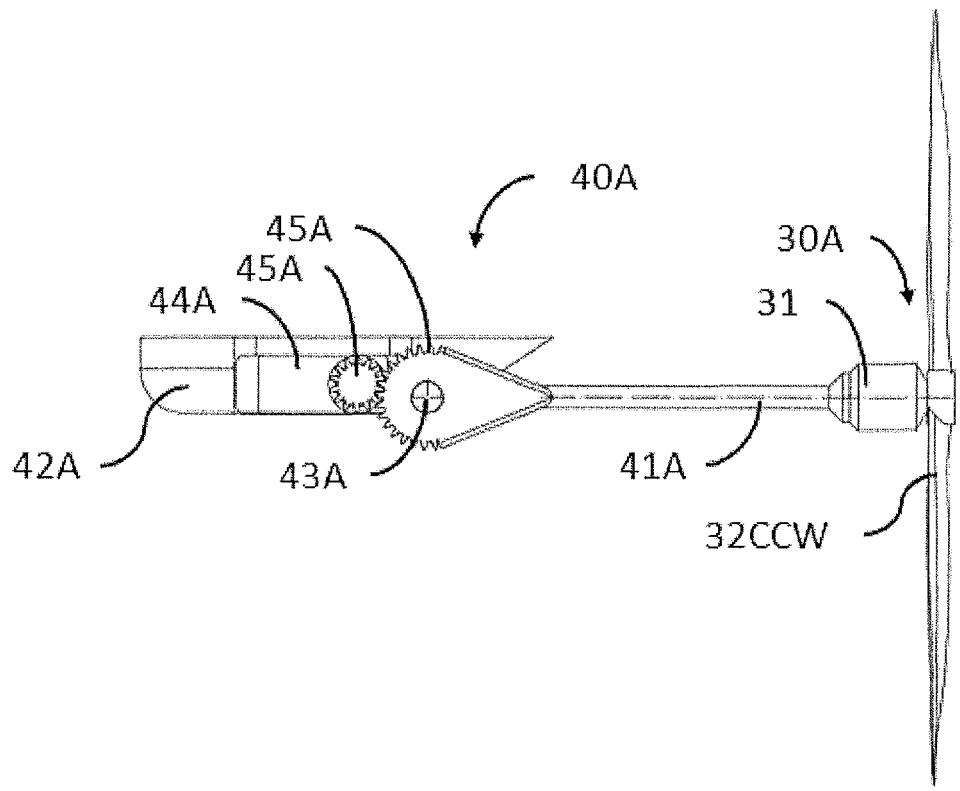
FIG. 4B is a left side view detailing the aft tilting propulsion unit support and propulsion unit in forward flight configuration in accordance with the principles of the present disclosure.
Figure 4C:
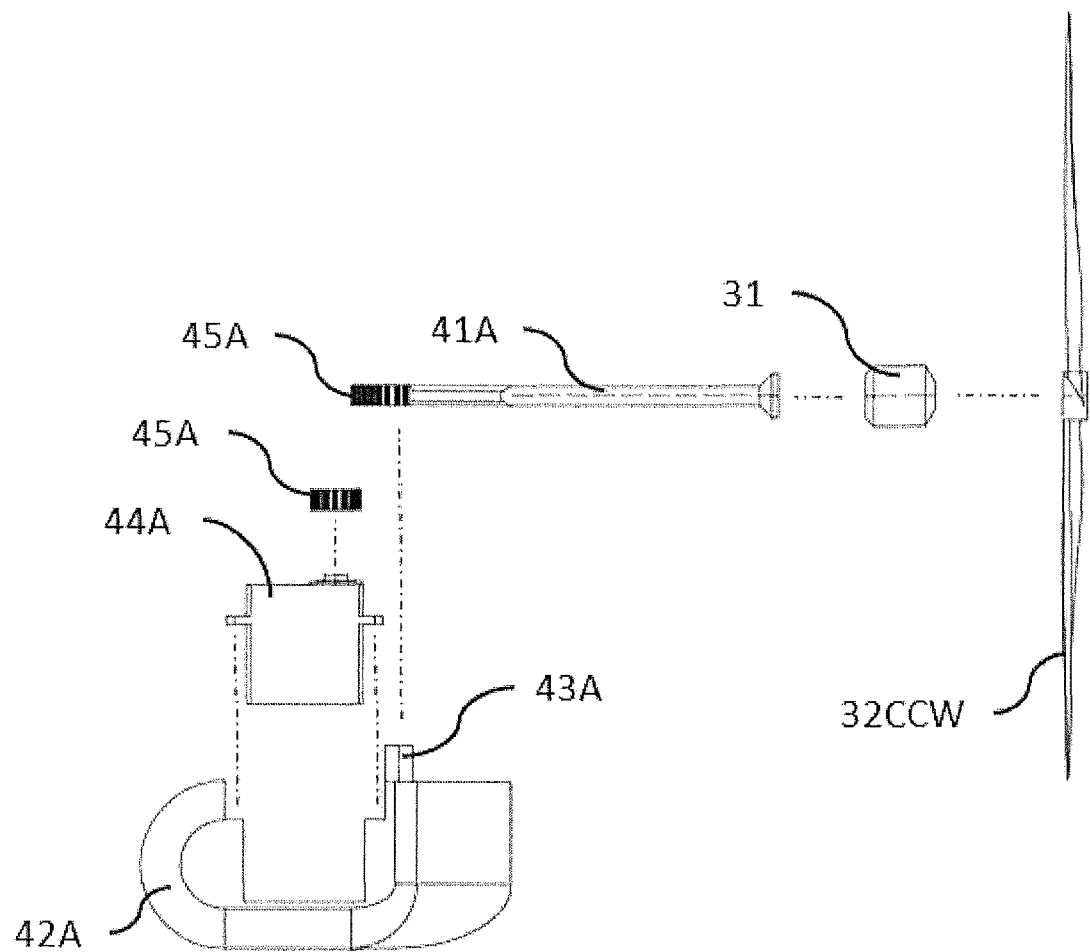
FIG. 4C is an exploded bottom view detailing the aft tilting propulsion unit support and propulsion unit in forward flight configuration in accordance with the principles of the present disclosure.
Figure 5:
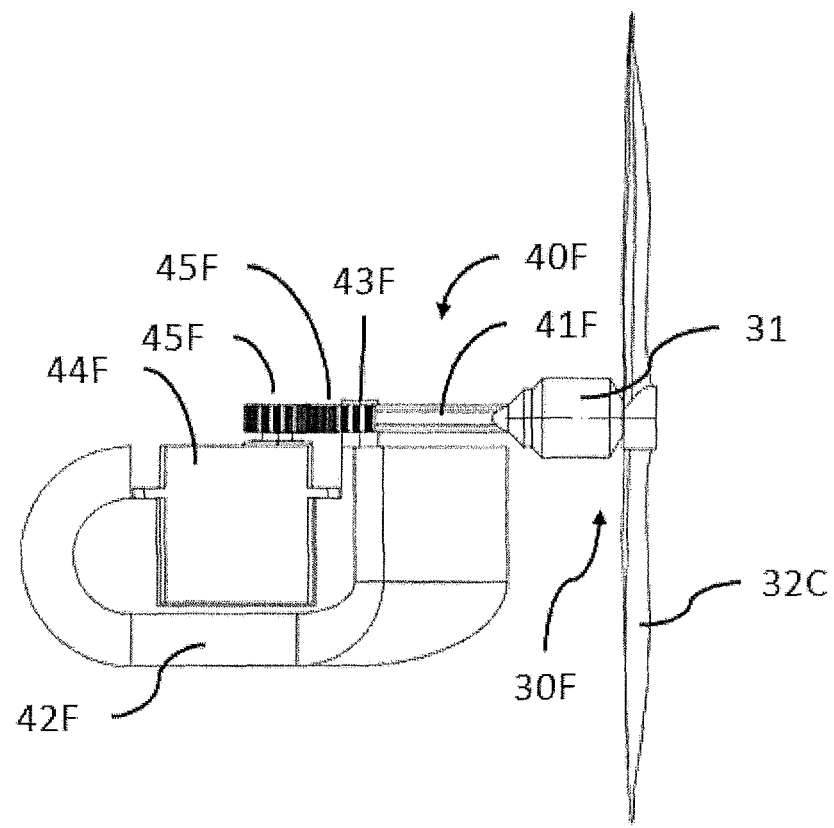
FIG. 5 is a bottom view detailing the forward tilting propulsion unit support and propulsion unit in forward flight configuration.

As can be observed in FIG. 2B, the preferred embodiment has two tilting propulsion unit supports 40F connected to the forward wing 10F and two tilting propulsion unit supports 40A connected to the aft wing 10A. As can be observed in FIG. 4A and FIG. 5, each tilting propulsion unit support is composed of a fixed section 42A and 42F that contains an electric servo actuator 44A and 44F, and an elongated rotating section 41A and 41F that rotates about a single axis hinge 43A and 43F. The servo actuator 44A and 44F tilts the rotating section 41A and 41F by using a geared drive 45A and 45F. The rotating section 41A and 41F is connected to the motor 31 of the propulsion units 30A and 30F, while the fixed section 41A and 41F is attached to the underside of a wing 10A or 10F. The tilting propulsion unit support 40A or 40F is able to tilt the propulsion unit 30A and 30F in such a way that the slipstream 34 of the propulsion unit 30A and 30F does not hit the tilting propulsion unit support 40A or 40F or the wing 10A or 10F, or other parts of the aircraft. When the aircraft is in forward flight configuration as shown in FIG. 1F, the propellers 32C or 32CCW lie in the general area behind the wings 10A or 10F, and the slipstreams 34 are generated backwards and way from the wings. FIG. 2E shows a front view of the aircraft in forward flight configuration, where the propeller disks 33 are drawn. The propeller disk circles 33 represent the area swept by the propellers as they rotate. It can be observed that the propulsion units 30A and 30F are displaced with respect to one another to minimize the overlap of propeller disks 33. This is to prevent the slipstreams 34 of the forward propulsion units 30A from hitting the rear propulsion units 30F as can be observed in FIG. 2F. When the aircraft is in hover flight configuration as shown in FIG. 3E, the propellers 32C or 32CCW lie under the wings 10A or 10F and the propeller slipstreams 34 are directed downward and away from the wings.

Other variations to the tilting propulsion unit supports are possible. For example, the servo motor could tilt the rotating section of the propulsion unit through a belt, chain, four-bar linkage or other mechanism. A different type of actuator could be used instead of a servo motor, such as a hydraulic system, or other type of system. Multiple propulsion unit supports could be rotated with a single actuator, using belts or drive shafts between the actuator and the tilting propulsion unit supports. The tilting propulsion unit supports could be able to rotate about more than one axis, to provide increase controllability to the aircraft or other benefit. The tilting propulsion unit supports could be attached to other parts of the aircraft such as the fuselage, or they could be placed directly on the wingtips of the wings.

D. Fuselage

The fuselage is a structure that forms the main body of the aircraft. The main function of the fuselage is to hold other components in place, and to provide an aerodynamic enclosure for a cockpit and passenger cabin if the aircraft is manned, and other components such as the flight controller and payload.

The preferred embodiment of the present invention is an unmanned aircraft which may be remotely piloted, autonomous, or semi-autonomous, and therefore does not contain a cockpit or passenger cabin. The preferred embodiment has one fuselage 20 which holds the aft wing 10A and forward wing 10F as well as the landing gear 50 and the flight controller 60. The fuselage can provide ample space for storing payload, as well as sensors or other desired additions. The location of the propulsion units 30F and 30A and the wings 10F and 10A with respect to the fuselage 20 provide ample space to place cameras and other sensors with unobstructed forward, side, or downward views, which is useful for surveillance and remote piloting, among other uses.

Other variations of the fuselage are possible. More than one fuselage could be used, or the invention could have no fuselage and be of a 'flying wing' type. The fuselage could have other shapes and sizes.

E. Landing Gear

The landing gear is a structure that allows the aircraft to land and take off safely from the ground. The preferred embodiment uses a fixed landing gear 50 with wheels 51 connected to the fuselage 20, and is of a tricycle type meaning that it has two main wheels on the back, and one forward steerable nose wheel. The landing gear 50 elevates the aircraft from the ground to provide sufficient clearance from the propellers 32C and 32CCW to the ground at any propulsion unit tilt angle. This allows the aircraft to takeoff or land in forward flight configuration using a standard runway, to do a short takeoff or landing in transition flight configuration using a short runway, or to do a vertical takeoff or landing in hover flight configuration without need for a runway.

Other variations of the landing gear are possible. These variations include using a retractable landing gear, so it can be folded up and stored inside the fuselage to minimize aerodynamic drag during flight or to avoid obstructing sensors. More wheels could be used, or a tandem landing gear configuration could be employed, where main landing wheels are used under the fuselage and outrigger wheels are placed under the wings. Alternatively, the landing gear could use landing legs or skids instead of wheels, which allow for vertical takeoffs or landings only but minimize weight and complexity.

F. Flight Controller

The aircraft's flight is controlled using a number of methods and devices such as moving the control surfaces, varying the thrust of the propulsion units, and tilting the propulsion units. The flight controller is an electronic device that translates the pilot's input into appropriate control signals for these control methods and devices in order to produce the desired flight behavior. The flight controller may also use internal stabilization algorithms and sensors to automatically stabilize the flight of the aircraft. Additionally, the flight controller may also use internal autonomous flight algorithms to provide varying degrees of flight autonomy ranging from semi-autonomous flight to fully autonomous flight. Other possible functionalities of the flight controller include transmitting telemetry data from the aircraft to a ground station, or recording flight information.

Figure 6:
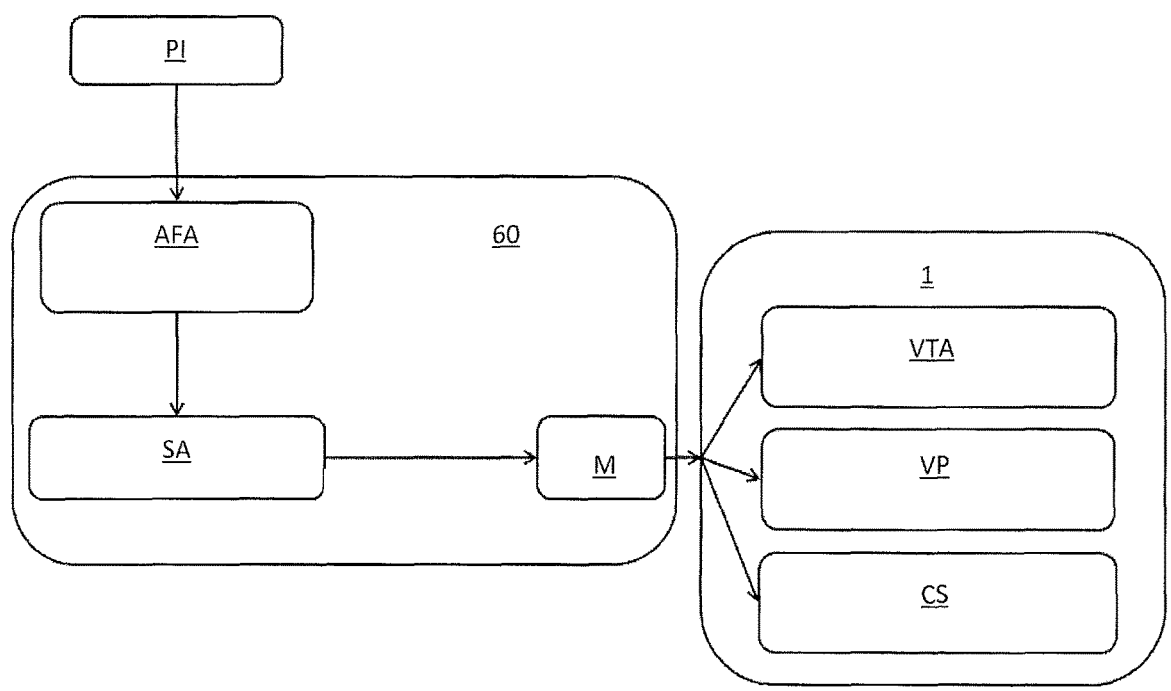
FIG. 6 is a diagram illustrating the preferred embodiment's control system.

FIG. 6 shows a diagram of the control system of the preferred embodiment. The preferred embodiment has one flight controller 60 placed inside the fuselage 20. Since the preferred embodiment is an unmanned aircraft 1, the pilot is on a remote location and the flight controller 60 receives the pilot's input PI in the form of a radio control signal. Using the pilot's control signal and data from the internal sensors, the flight controller uses autonomous flight control algorithms AFA, stabilization algorithms SA and mixer M to produce appropriate control signals for the aircraft's control methods and devices. These control methods and devices consist of varying the tilt angle VTA of the propulsion units 30A and 30F, varying the speed VP of the motors 30 to adjust the thrust produced by the propulsion units 30A and 30F, and moving the control surfaces CS of the aft wing 10A.

G. Detailed Description of the Preferred Embodiment

The present invention uses two or more fans to provide thrust for hovering and forward flight. Fans, such as propellers, rotors or ducted fans, are ideal propulsion devices for hovering flight because they provide higher efficiency at hovering conditions than other propulsion methods such as turbojets. The most efficient fan design for a hovering vehicle is to use a single main fan of a large diameter, as is done in helicopter designs. However, the helicopter design comes with significant drawbacks; mainly that a tail rotor must be used to cancel the main rotor's torque, consuming about 15% of the total power, and that the main rotor requires complex cyclic and collective pitch mechanisms to allow for control of the aircraft. These mechanisms can require heavy actuators, can add complexity and reduce the reliability of the system, and can be expensive to maintain. An alternative design, known as the multirotor design, uses multiple smaller fans instead of a large one. By using an even number of fans, and rotating half of the fans clockwise and the other counter-clockwise, the net torque of the fans can be cancelled and a torque-cancelling fan is not required. If an odd number of fans are used, the fans can be slightly tilted to cancel any net torque. Secondly, the attitude of the aircraft can be controlled in a simple way by adjusting the thrust and torque generated by each fan. If the fans are fixed-pitch propellers, this can be achieved by varying the speed of each propeller. Although multirotor designs are often inherently unstable, an electronic flight controller device can be employed to actively control the thrust of the propulsion units and effectively stabilize the aircraft. For these reasons, the multirotor design provides a mechanically-simple and highly controllable hovering aircraft design that is commonly used in unmanned aerial vehicles. The preferred embodiment employs a multirotor design with four fixed-pitch propellers 32C and 32CCW with electric motors 31 for propulsion. This number provides a balance between the level of controllability and stability, and the cost and maintenance required for multiple propulsion units. Electric motors with fixed-pitch propellers provide for a mechanically simple design. The use of four propulsion units also provides a high degree of controllability, which, combined with a stabilization and control algorithm on a flight controller, can produce a very stable and maneuverable hovering aircraft.

Although fans can be efficient devices for hovering flight, they have limited capabilities for forward flight. In forward flight, a wing can produce lift more efficiently than a fan, as evidenced with the generally higher flight time and range capabilities of airplanes as compared to helicopters. Additionally, although a large fan is efficient for hovering flight, a smaller fan often proves to be more efficient for forward flight, and can allow for higher top speeds. Many VTOL designs attempt to produce designs that are capable of efficient vertical and forward flight by combining vertical-lift fans with forward-flight wings. Some designs use vertical-lift fans that are used in hovering only, and therefore can be optimized for hovering conditions. However, they provide a dead-weight in forward flight. The present invention uses a 'tilt-rotor' configuration, where all the fans can be tilted for use in both hovering flight and forward flight configurations, and are designed to provide a balance of efficiency between the two flight modes.

A significant challenge of the tilt-rotor design is that the propeller slipstream produced by the fans can hit other parts of the aircraft, reducing the effective thrust available to the aircraft and possibly inducing flight instability. This is especially important for hovering flight, because it can have a detrimental effect on hover power requirements and endurance. Different VTOL tilt-rotor designs deal with these issues in various ways. For example, the V-22 Osprey aircraft uses large rotors mounted on the wingtips of relatively small wings, so as to minimize the fraction of propeller slipstream that hits the wing. When in hover mode, the flaps of the wing are lowered to minimize the wing area exposed to the propeller slipstream. However, a design with more than two fans can provide a superior level of controllability. If more than two fans will be used, they are likely to be smaller relative to the wing, and a larger fraction of the propeller slipstream will hit the wing. This is the case of the design presented in U.S. Pat. No. 8,616,492. This design uses six propellers that are strategically placed so that the propeller slipstream of the fans only minimally hits parts of the aircraft when in forward flight configuration. However, a large fraction of the propeller slipstream hits the wing in when the propellers are in vertical flight configuration. Additionally, in forward flight configuration the propeller slipstream still hits the wing and the motor pods. Another design that attempts to circumvent this problem is that of U.S. Pat. No. 6,655,631. This design places the propellers on structures that extend forward and backwards from the wing far enough such that the propeller slipstream does not hit the wing in hover configuration. However, since the propellers rotate in place, the propeller slipstream from the front propellers hits the rear propellers and the wing when in forward flight configuration. This could cause a significant loss in performance of the rear propellers. Another more recent effort is that of US patent application 20120261523 A1. This design places the propellers in structures similar to that of U.S. Pat. No. 6,655,631, but the entire structure rotates maintaining the same relative position of the fans such that the propeller slipstream of one fan never hits the another fan or the wing. However, the propeller slipstream from the propellers contacts the propeller supporting structures at all times. Another significant setback of this design is that the size of the propellers and the overall design of the vehicle are significantly constrained by the requirement that the propeller disks and wings cannot overlap when seen from a top view of the hover configuration, and because larger diameter propellers would need longer and heavier the supporting structures. The present invention employs a design that limits or prevents the propeller slipstream from hitting any part of the aircraft at any tilt angle, without limiting the overall design of the aircraft or the size of the propellers in such a way. It achieves this by (1) placing all the fans in pusher configuration, meaning that the propeller slipstream is produced away from the fan supporting structure, (2) by placing them so they are partly under the wing when in hover configuration and partly behind the wing in forward flight configuration so the propeller slipstream is always directed away from the wing, and (3) by displacing forward propellers with respect to rear propellers and wings to prevent or minimize propeller slipstream from the front propellers hitting the rear propellers or wings when in forward flight configuration. This design effectively maximizes the use of available thrust, minimizing the required power for flight, and optimizing aircraft performance parameters such as flight time and range. Since the propellers disks 33 are allowed to lie under the wings 10A and 10F as shown in FIG. 3C, there is no constraint regarding the size of the propeller with respect to the size of the wing, and a more compact planform area can be achieved for the aircraft, reducing size and weight. This propeller design and placement is similar to that of U.S. Pat. No. 2,478,847 A. However, the design presented in U.S. Pat. No. 2,478,847 A suffers from two major flaws which make it unpractical. Firstly, the design uses only two propellers under the wing, which would produce an aircraft that behaves as an inverted pendulum about its pitch axis, and therefore is unstable and has poor pitch control. The preferred embodiment of the present invention uses four propulsion units and a multirotor control method to resolve this issue. Secondly, the design presented in U.S. Pat. No. 2,478,847 requires a complex system of drive shafts to drive the propellers using a gas engine. The preferred embodiment of the present invention uses electric motors directly connected to the propellers to eliminate the need for complex drive shafts, thereby lowering the aircraft's weight and complexity, as well as manufacturing and maintenance costs. Finally, by employing four propellers instead of two, the preferred embodiment of the present invention is able to use the effective multirotor control method while in hover configuration.

Furthermore, the tilting propulsion unit supports 40A and 40F are designed to produce a specific translational movement of the propulsion units 30A and 30F as they rotated between vertical and horizontal orientations, so the thrust line 90 always passes through the center of gravity 70 of the aircraft or close to it, at any tilt angle of the propulsion units. The thrust line 90 represents the point at which the net thrust force from all the propulsion units is concentrated. If all propulsion units run at the same power setting (which is the most efficient configuration if the propulsion units are identical to one another), the thrust line is located in the geometric mean between the locations of all the propulsion units. This can be clearly observed in FIG. 2F, which shows the preferred embodiment in forward flight configuration. When the propulsion units 30A and 30F are in forward flight configuration, the thrust line 90 passes through the center of gravity, and the thrust center 80 lies behind the center of gravity 70. In FIG. 3E the propulsion units 30A and 30F have been rotated for hover flight configuration, and the thrust line 90 still passes through the center of gravity 70 and the thrust center 80 lies below the center of gravity 70. Since the thrust line 90 passes through the center of gravity 70 in both configurations, the propulsion unit thrust does not produce a destabilizing torque on the aircraft. This is achieved through a strategic design of the tilting propulsion unit supports 40A and 40F, so they produce a specific translational motion of the propulsion units 30A and 30F as they are tilted between hover and forward flight configurations. More specifically, the aft tilting propulsion unit support rotating sections 41A are made relatively long so that the aft propulsion units 30A are translated forward considerably as they are tilted from forward flight to hover flight configurations. This forward translation is designed to maintain the thrust line 90 passing through the center of gravity 70. The forward propulsion unit support rotating sections 41F are kept short so that the forward propulsion units 30F do not extend too far below the forward wing 10F when the aircraft is in hover configuration, and therefore the landing gear 50 does not need to too long to maintain clearance of the forward propulsion units 30F and the ground when landed. Designing the tilting mechanism so the thrust line 90 passes through the center of gravity 70 is beneficial in that it allows all propellers to run at the same speed and thrust level to maintain stability, which is the most efficient configuration if all the propulsion units are identical to one another. However, if the mechanism is designed such that the thrust line does not precisely pass through the center of gravity, the aircraft could still fly in a stable manner by generating more thrust in some propulsion units and less in others. Although this is a less efficient way of using the propulsion units, it allows for more flexibility in the design of the tilting propulsion unit supports which may be used to optimize other aspects of the design such as weight and complexity.

The tilting mechanism could also be designed such that when the propulsion units are tilted for forward flight configuration, the propellers are at a higher level than the wings. Since the propellers generate an area of low pressure upstream of the propeller, this configuration would place this area of low pressure on top of the wing, which would cause an increase in wing lift and therefore an increase in flight efficiency. This way the design could benefit from this low-pressure effect to further increase the efficiency during forward flight.

If four propulsion units in pusher configuration are to be used, a tandem wing configuration proves to be a better choice than a conventional airplane wing configuration. An important requirement for stability of a VTOL aircraft in hover flight is that the net thrust center should be directly below or above the aircraft's center of gravity. A standard configuration, which has a single main wing and a set of vertical and horizontal stabilizers on the rear, requires the center of gravity to be located roughly one fourth of the way from the leading edge to the trailing edge of the main wing in order for the aircraft to have forward flight stability. As mentioned before, placing propellers in front and behind the wing in the way done in US patent application 20120261523 and U.S. Pat. No. 6,655,631 allows the center of thrust to lie below the center of gravity. However, by observing the design of U.S. Pat. No. 2,478,847 A it can be seen that it would be very challenging to place four propellers under the main wing in a pusher configuration, while still having the center of thrust align with the center of gravity during hover flight configuration. The preferred embodiment of the present invention uses a tandem wing design to resolve this issue. By dividing the lift between one aft wing 10A and a smaller forward wing 10F, the required center of gravity 70 location for forward flight stability is located closer to the aft wing 10A than to the forward wing 10F. This way it is possible to align the center of thrust with the center of gravity, while still having the propellers placed in pusher configuration. A tandem wing configuration can also provide better forward flight aerodynamic performance than a conventional airplane wing configuration because it eliminates the need of a negative-lift horizontal stabilizer which is usually required for stability on a conventional configuration.

The combination of pusher fans placed under or behind the wings with a tandem wing design also provides other major advantages which are ideal for VTOL flight. One of the challenges of a VTOL aircraft is maintaining stable flight, especially during hover and during the transition between hover and forward flight. The main stabilization mechanism is electronic stabilization using the flight controller 60, which is in charge of maintaining the desired orientation at all times by using aircraft control mechanisms such as controlling the thrust of the propulsion units, the control surfaces, and the tilt of the propulsion units. However, the aircraft has a number of features integrated into its aerodynamic design that are conducive to a stable aircraft during all three flight configurations, and minimize the need for electronic stabilization. Firstly, the tandem wing design is stable in forward flight, meaning that electronic stabilization is not a necessity when flying in forward flight. Secondly, the tandem wing aerodynamic design is also stable at high angles of attack, which is a very attractive feature for hovering flight. For example, if the aircraft is hovering in level orientation and climbing vertically such as on a vertical takeoff, a standard airplane configuration (consisting of a main wing, vertical stabilizer, and horizontal stabilizer) would produce a strong pitching torque that would try to point the aircraft in the direction it is flying. This would destabilize the hovering flight, and the flight controller would need to counteract this pitching torque using differential thrust in order to maintain the aircraft's level orientation. However, the tandem wing configuration would produce a minimal pitching torque in the same flight conditions. The benefit is similar during a vertical or near-vertical descent with the aircraft leveled, such as when the aircraft is descending for a vertical landing. Thirdly, the vertical stabilizers of the aircraft 13A are sized large enough to provide appropriate yaw stability during forward flight, but are kept at a minimum size to minimize the aerodynamic yawing torque caused if the aircraft were to hover while strafing to one side. While standard airplane configuration would produce a strong yawing torque that tries to point the aircraft in the direction of flight, the current design would produce a minimal torque, which can be more easily managed by the flight controller 60 stabilization. The small size of the vertical stabilizers 13A also minimizes the side-profile of the aircraft, which minimizes its susceptibility to wind.

The tandem wing design also makes the overall vehicle more compact by dividing the lift force between two smaller wings. In order to further increase the portability of the aircraft, the preferred embodiment uses wings which are divided into central wing sections 11A and 11F, and outer wing sections 12A and 12F. The outer wing sections can be easily detached to reduce the size of the aircraft for transportation. If the aircraft will be used in hover mode only, it can be flown without the outer wing sections. This reduces the susceptibility to wind and turbulence during hover flight, and reduces the takeoff weight, improving performance. Other embodiments could use telescoping wings that are able to retract the outer sections and store them inside the center section. This retraction and extension could be done automatically using a mechanism, or manually. Using an automatic retraction mechanism, the aircraft could take off with retracted wings in order to minimize takeoff space required and wind susceptibility during takeoff, and then extend the wings once it moves into open space, before transitioning to forward flight. This would make the aircraft even more practical and usable. However, the invention could work well without any of these detachment or retraction methods in the wings.

In summary, the preferred embodiment combines multiple design concepts in a holistic way to provide a highly stable, controllable and efficient VTOL aircraft capable of hover, forward and transition flight. These preferred design concepts include: (1) a pusher propeller configuration with strategic placement which maximizes the effective use of thrust, (2) four fixed-pitch propellers which allow for the highly-controllable and mechanically simple control methods used in multirotor aircraft, (3) electric motors which lead to mechanically simple, lightweight and reliable operation, (4) and a tandem wing configuration which is stable, controllable and efficient in both hovering and forward flight. Other benefits of this design include being capable of full runway, short runway or vertical takeoffs or landings, having unobstructed forward view for camera and sensor placement, and providing for a compact, mechanically simple and low-maintenance VTOL aircraft design.

H. Operation of Preferred Embodiment

The aircraft can fly in hovering flight configuration, in forward flight configuration, or in a flight transition configuration. In the hover configuration, the four tilting propulsion unit supports 40A and 40F are tilted such that the four propulsion units are directed to produce thrust in the upward direction with respect to the aircraft, as shown in FIG. 2B. The propulsion units 30A and 30F can then produce the required lift force to lift and maintain the aircraft hovering in the air. In this configuration the aircraft has a limited flight speed and its wings 10A and 10F cannot produce significant lift, and the propulsion units 30A and 30F produce the majority of the lift force required to keep the aircraft in the air. The flight direction is controlled by tilting the aircraft in desired direction and producing an appropriate amount of net thrust, in a manner similar to a helicopter. Control of the orientation of the aircraft is achieved by independently controlling the speed of each propeller 32C and 32CCW, which causes fans to produce differential thrusts and torques, which lead to net torques on the aircraft that cause it to rotate in the desired direction. This method of control is commonly used in quadcopter aircraft and other multirotor aircraft. For example, to change the pitch of the aircraft, the two aft propulsion units 30A would produce a thrust different than the two forward propulsion units 30F, generating a net torque which would rotate the aircraft about its pitch axis. To control the yaw of the aircraft, the two clockwise-rotating propellers 32CW would be spun at a different speed than the two counter-clockwise-rotating 32CCW propellers, so that there is a net torque which causes the aircraft to rotate about its yaw axis. The propulsion units 30A and 30F could also be tilted differentially to provide control of the orientation of the aircraft. The appropriate speeds required for each motor to provide for stable and controlled flight are calculated by a flight controller device 60, which incorporates data from sensors such as gyroscopes and accelerometers, and from the control input obtained from an automated control system and/or a pilot, to determine the appropriate motor speeds.

In forward flight mode the tilting propulsion unit supports are tilted such that all the propulsion units produce thrust in the forward direction with respect to the aircraft as shown in FIG. 2F, producing the required thrust force to propel the aircraft forward through the air at a speed that allows the wings 10A and 10F to produce the required lift force to counteract the aircraft's weight. In this flight configuration most of the lift is provided by the wings and the main purpose of the propulsion units is to overcome the aerodynamic drag force on the aircraft, in a manner similar to an airplane. This allows for a lower power setting of the propulsion units, which allows for longer flight times in this configuration. However, the aircraft can still use the higher power setting to fly faster. Control in this configuration is achieved through the use of moving control surfaces on the aft wing. The control surfaces tilt up and down together to provide pitch control like an elevator control surface, and tilt differentially to provide roll control like an aileron control surface. Differential thrust of the propellers can be used to control yaw. The design of the wings is such that the aircraft is aerodynamically stable in forward flight and does not require the use of flight controller stabilization. Since the propulsion units are not required for the stability or control of the forward flight, the aircraft has the capability of controlled glide in the case of a motor failure. However, an aerodynamically-unstable design could also be used if electronic stabilization is employed for forward flight using the flight controller device. Since in this configuration the propellers are located behind the wings and produce a rearward propeller slipstream, and the aft propellers are elevated with respect to the front propellers, the propeller slipstream does not contact any other part of the aircraft, and the available thrust for forward flight is maximized.

The aircraft can also fly in a transition mode, where the propulsion units are at any orientation that produces thrust between the vertical and forward directions. In this configuration both the propellers and wings are used to produce lift. Control can be achieved through combining the use of one or more of following methods: wing control surfaces, differential thrust, differential torques, and differential tilting of the propellers, or other methods.

The aircraft is capable of changing between the hover, forward flight, and transition flight configurations during flight. For example, the aircraft can take off vertically, climb vertically, and then transition into forward flight. The hover configuration allows for slow flight and hovering, which is useful for landing, taking off or maneuvering in tight spaces. The forward flight mode allows for a higher top speed than the hover mode, as well as better flight range and flight time.

The aircraft employs a flight controller 60 to stabilize the flight of the aircraft, and may also provide autonomous flight capabilities. FIG. 6 shows a diagram illustrating the preferred embodiment's control system. The pilot's control inputs, consisting of desired pitch, yaw, roll and transition level settings, are received by the flight controller. This control inputs may be transmitted wirelessly from the ground using a transmitter system or other type of system. The flight controller employs autonomous flight control algorithms which generate new or modified output control values based on pilot input, and on sensor data such as GPS, accelerometer and barometer data. The autonomous control algorithms may provide variable levels of autonomy, in which the aircraft is controlled in part by these algorithms and in part by the pilot's input, completely by pilot input, or completely by the autonomous algorithms, in which case the pilot's inputs are not needed. These algorithms generate new or adjusted pitch, yaw, roll and transition level settings, which go into the stabilization algorithms. The stabilization algorithms modify the control signals based on sensor data such as accelerometer and gyroscope data, in order to ensure that the aircraft follows the desired behavior in a stable and controlled manner. These algorithms may be Proportional-Integral-Derivative controllers, or other type of algorithms. Finally, these adjusted signals are sent to a mixer algorithm, which translates the signals into appropriate signals for the aircraft actuators: the motor tilts, propulsion unit speeds, and control surface settings. For example, the input to the mixer might be to pitch up during hover flight, and the mixer code would control the front motors to increase thrust, and the rear motors to decrease thrust. The mixer is in charge of coordinating all the control actuators in order to produce the desired behavior in the aircraft. The mixer is also designed to be able to control the pitch, yaw, and roll of the aircraft independently of the tilt level of the motors. This way the aircraft can maintain full control and stability at any proportional transition level between hover and forward flight, creating a very stable and controlled transition behavior. The flight controller may also implement various control modes during flight, which are common with multicopter aircraft. For example, one control mode can automatically level the aircraft at all times, and the pilot input determines to what degree the aircraft rotates in either direction (commonly known as auto-level mode). Another flight mode might just cancel the rotation of the aircraft, while the pilot input determines at what rotational speed the aircraft rotates in either direction (commonly known as acrobatic or stabilize mode).

What has been described and illustrated herein is a preferred embodiment of the invention along with some of its variations. Descriptions and figures used herein are set forth by way of illustration only and are not meant as limitations. Those skilled in the art will recognize that many variations are possible within the spirit and scope of the invention in which all terms are meant in their broadest, reasonable sense unless otherwise indicated. Any headings utilized within the description are for convenience only and have no legal or limiting effect.

In summary of the previous sections, the invention presented here is structurally innovative, presents advantages not available at the moment, and is hereby lawfully submitted for review and the granting of the commensurate patent rights.

While the invention has been described as having a preferred design, it is understood that many changes, modifications, variations and other uses and applications of the subject invention will, however, become apparent to those skilled in the art without materially departing from the novel teachings and advantages of this invention after considering this specification together with the accompanying drawings. Accordingly, all such changes, modifications, variations and other uses and applications which do not depart from the spirit and scope of the invention are deemed to be covered by this invention as defined in the following claims and their legal equivalents. In the claims, means-plus-function clauses, if any, are intended to cover the structures described herein as performing the recited function and not only structural equivalents but also equivalent structures.

All of the patents, patent applications, and publications recited herein, and in the Declaration attached hereto, if any, are hereby incorporated by reference as if set forth in their entirety herein. All, or substantially all, the components disclosed in such patents may be used in the embodiments of the present invention, as well as equivalents thereof. The details in the patents, patent applications, and publications incorporated by reference herein may be considered to be incorporable at applicant's option, into the claims during prosecution as further limitations in the claims to patentable distinguish any amended claims from any applied prior art.

I claim:

1. An aircraft for executing hovering flight, forward flight, and transitioning between the two comprising in combination,
   a front wing,
   an aft wing,
   at least a fuselage,
   at least a landing gear,
   at least one flight controller, at least a front propulsion assembly, wherein said front propulsion assembly comprises a front tilting propulsion support including a front propulsion unit in a continuous pusher configuration;

at least an aft propulsion assembly, wherein said aft propulsion assembly comprises an aft tilting propulsion support with an aft propulsion unit in a continuous pusher configuration;

wherein said front wing and aft wing are in a tandem configuration;

wherein said fuselage is at least partially located between said front wing and said aft wing;

wherein said front propulsion assembly is attached to said front wing, shifted longitudinally backwards relative to the aerodynamic center of said front wing;

wherein said aft propulsion assembly is attached to said aft wing, shifted longitudinally backwards relative to the aerodynamic center of said aft wing;

wherein a thrust center determined by the location of said front propulsion unit and said aft propulsion unit is aligned on a vertical axis with the center of gravity of the aircraft during hover flight;

wherein an aerodynamic center determined by the location and size of both said front wing and said aft wing is located at or behind the center of gravity of the aircraft on a longitudinal axis during forward flight; and wherein said aft wing is larger relative to said front wing.

2. An aircraft as in claim 1, wherein said front wing comprises a front central section and front outer sections, wherein said front outer sections are mechanically attached to said front central section.

3. An aircraft as in claim 2, wherein said front outer sections are detachable from said front central section.

4. An aircraft as in claim 2, wherein said front propulsion assembly is attached to the front central section.

5. An aircraft as in claim 4, wherein said front wing comprises at least a third propulsion assembly, said third propulsion assembly coupled to said front central section.

6. An aircraft as in claim 1, wherein said aft wing comprises a aft central section and aft outer sections, wherein said aft outer sections are mechanically attached to said aft central section.

7. An aircraft as in claim 6, wherein said aft outer sections are detachable from said aft central section.

8. An aircraft as in claim 6, wherein said aft propulsion unit is attached to the aft central section.

9. An aircraft as in claim 8, wherein said aft wing comprises at least a fourth propulsion assembly, said fourth propulsion assembly is attached to said aft central section.

10. An aircraft as in claim 1, wherein said front wing is vertically shifted a front distance from the aft wing with respect to the fuselage, wherein the propulsion unit comprises a propeller, wherein each propeller comprises a propeller radius.

11. An aircraft as in claim 10, wherein vertically shifted distance between the front wing and the aft wing is at least the propeller radius.

12. An aircraft as in claim 1 comprising sensors, wherein said sensors are electrically coupled to the flight controller; and wherein said front propulsion assembly and said aft propulsion assembly are electrically coupled to said flight controller.

13. An aircraft as in claim 1 wherein the front wing comprises at least a stabilizer.

14. An aircraft as in claim 1 wherein the aft wing comprises at least a stabilizer.

15. An aircraft for executing hovering flight, forward flight, and transitioning between the two comprising in combination, a front wing, a aft wing, at least a fuselage, at least a landing gear, at least one flight controller, at least a front pair of propulsion assemblies, wherein each propulsion assembly of said front pair of propulsion assemblies comprises a front tilting propulsion support including a front propulsion unit in a continuous pusher configuration;

at least an aft pair of propulsion assemblies, wherein each propulsion assembly of said aft pair of propulsion assemblies comprises an aft tilting propulsion support with an aft propulsion unit in a continuous pusher configuration;

wherein said front wing and aft wing are in a tandem configuration;

wherein said fuselage is at least partially located between said front wing and said aft wing;

wherein said front pair of propulsion assemblies is attached to said front wing, shifted longitudinally backwards relative to the aerodynamic center of said front wing;

wherein said aft pair of propulsion assemblies is attached to said aft wing, shifted longitudinally backwards relative to the aerodynamic center of said aft wing;

wherein a thrust center determined by the location of said front propulsion unit and said aft propulsion unit is aligned on a vertical axis with the center of gravity of the aircraft during hover flight;

wherein an aerodynamic center determined by the location and size of both said front wing and said aft wing is located at or behind the center of gravity of the aircraft on a longitudinal axis during forward flight, and wherein said aft wing is larger relative to said front wing.

16. An aircraft as in claim 15, wherein the front wing comprises at least a front stabilizer.

17. An aircraft as in claim 15, wherein the aft wing comprises at least a aft stabilizer.

18. An aircraft as in claim 15, wherein said front wing comprises a front central section and front outer sections, wherein said front outer sections are mechanically attached to said front central section.

19. An aircraft as in claim 18, wherein said front outer sections are detachable from said front central section.

20. An aircraft as in claim 18, wherein said front set of propulsion assembly is attached to said front central section.

\* \* \* \* \*